US009284669B2

(12) United States Patent
Li et al.

(10) Patent No.: US 9,284,669 B2
(45) Date of Patent: Mar. 15, 2016

(54) PROCESSING AIDS FOR OLEFINIC WEBS, INCLUDING ELECTRET WEBS

(75) Inventors: Fuming B. Li, Woodbury, MN (US); John M. Sebastian, Oakdale, MN (US); Marvin E. Jones, Grant, MN (US); John M. Brandner, St. Paul, MN (US); David A. Olson, St. Paul, MN (US); Justin L. Keough, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 813 days.

(21) Appl. No.: 13/260,868

(22) PCT Filed: Mar. 30, 2010

(86) PCT No.: PCT/US2010/029157
§ 371 (c)(1),
(2), (4) Date: Dec. 15, 2011

(87) PCT Pub. No.: WO2010/114820
PCT Pub. Date: Oct. 7, 2010

(65) Prior Publication Data
US 2012/0090614 A1 Apr. 19, 2012

Related U.S. Application Data

(60) Provisional application No. 61/166,411, filed on Apr. 3, 2009.

(51) Int. Cl.
B03C 3/00 (2006.01)
D04H 1/4291 (2012.01)
D04H 1/54 (2012.01)
D04H 3/007 (2012.01)
D04H 3/16 (2006.01)
D01F 1/10 (2006.01)
B01D 39/16 (2006.01)
D01D 5/098 (2006.01)
D01F 6/04 (2006.01)
C08F 2/00 (2006.01)

(52) U.S. Cl.
CPC .......... *D04H 1/4291* (2013.01); *B01D 39/1623* (2013.01); *D01D 5/0985* (2013.01); *D01F 1/10* (2013.01); *D01F 6/04* (2013.01); *D04H 1/54* (2013.01); *D04H 3/007* (2013.01); *D04H 3/16* (2013.01); *B01D 2239/0435* (2013.01); *B01D 2239/086* (2013.01); *C08F 2/00* (2013.01); *Y10T 29/49226* (2015.01)

(58) Field of Classification Search
CPC ............. B01D 39/163; B01D 39/1623; B01D 39/1607; C08F 2/00; C08F 2500/03
USPC .................. 96/15, 66, 69; 95/57; 55/254, 528
See application file for complete search history.

(56) References Cited

U.S. PATENT DOCUMENTS

| 3,925,376 A | 12/1975 | Chalmers |
| 3,971,373 A | 7/1976 | Braun |
| 4,100,324 A | 7/1978 | Anderson |
| 4,118,531 A | 10/1978 | Hauser |
| 4,215,682 A | 8/1980 | Kubik |
| 4,264,750 A | 4/1981 | Anand |
| RE30,782 E | 10/1981 | van Turnhout |
| 4,375,718 A | 3/1983 | Wadsworth |
| RE31,285 E | 6/1983 | van Turnhout et al. |
| 4,429,001 A | 1/1984 | Kolpin |
| 4,508,781 A | 4/1985 | Yagi |
| 4,536,440 A | 8/1985 | Berg |
| 4,557,945 A | 12/1985 | Yagi |
| 4,588,537 A | 5/1986 | Klaase |
| RE32,171 E | 6/1986 | van Turnhout |
| 4,592,815 A | 6/1986 | Nakao |
| 4,652,282 A | 3/1987 | Ohmori |
| 4,789,504 A | 12/1988 | Ohmori |
| 5,057,710 A | 10/1991 | Nishiura |
| 5,401,446 A | 3/1995 | Tsai |
| RE35,062 E | 10/1995 | Brostrom |
| 5,496,507 A | 3/1996 | Angadjivand |
| 5,726,107 A | 3/1998 | Dahringer |
| 5,908,598 A | 6/1999 | Rousseau |
| 5,919,847 A | 7/1999 | Rousseau |
| 5,968,635 A | 10/1999 | Rousseau |
| 5,976,208 A | 11/1999 | Rousseau |
| 6,123,752 A | 9/2000 | Wu |
| 6,133,414 A | 10/2000 | Pfaendner |
| 6,213,122 B1 | 4/2001 | Rousseau |

(Continued)

FOREIGN PATENT DOCUMENTS

| EP | 1019173 | 7/2008 |
| EP | 845554 | 11/2009 |

(Continued)

OTHER PUBLICATIONS

Brown, "Air Filtration", Pergamon Press, 1993, Title, Publication and Table of Contents, 10 pgs.

(Continued)

*Primary Examiner* — Jason M Greene
*Assistant Examiner* — Karla Hawkins
(74) *Attorney, Agent, or Firm* — Jeffrey M. Olofson

(57) ABSTRACT

Methods of preparing polymeric webs include hot melt blending of thermoplastic resins and processing aids. The process aids include hindered amine N-substituted succinimide oligomers. The webs prepared from the blends may be in the form of films or non-woven fibrous webs. Non-woven microfiber webs are useful as filtration media. Among the polymeric webs produced are electret webs. The processing aids also function as charge-enhancing additives for the electret webs.

20 Claims, No Drawings

(56) References Cited

U.S. PATENT DOCUMENTS

| | | | |
|---|---|---|---|
| 6,214,094 | B1 | 4/2001 | Rousseau |
| 6,238,466 | B1 * | 5/2001 | Rousseau et al. ............. 96/15 |
| 6,268,495 | B1 | 7/2001 | Rousseau |
| 6,365,088 | B1 | 4/2002 | Knight |
| 6,397,458 | B1 | 6/2002 | Jones |
| 6,398,847 | B1 | 6/2002 | Jones |
| 6,406,657 | B1 | 6/2002 | Eitzman |
| 6,409,806 | B1 | 6/2002 | Jones |
| 6,419,871 | B1 | 7/2002 | Ogale |
| 6,432,175 | B1 | 8/2002 | Jones |
| 6,454,986 | B1 | 9/2002 | Eitzman |
| 6,562,112 | B2 | 5/2003 | Jones |
| 6,620,892 | B1 | 9/2003 | Bertin |
| 6,660,210 | B2 | 12/2003 | Jones |
| 6,808,551 | B2 | 10/2004 | Jones |
| 6,969,484 | B2 | 11/2005 | Horiguchi |
| 7,244,291 | B2 | 7/2007 | Spartz |
| 7,244,292 | B2 | 7/2007 | Kirk |
| 7,390,351 | B2 | 6/2008 | Leir |
| 7,765,698 | B2 | 8/2010 | Sebastian |
| 2001/0041760 | A1 * | 11/2001 | Harunari et al. ............. 524/194 |
| 2002/0174869 | A1 | 11/2002 | Gahan |
| 2003/0134515 | A1 | 7/2003 | David |
| 2007/0180997 | A1 | 8/2007 | Leir |
| 2007/0200272 | A1 | 8/2007 | Horst |
| 2007/0208112 | A1 | 9/2007 | Schambony |
| 2008/0045662 | A1 | 2/2008 | Roth |
| 2009/0293279 | A1 | 12/2009 | Sebastian |
| 2011/0137082 | A1 | 6/2011 | Li |
| 2011/0154987 | A1 | 6/2011 | Li |
| 2012/0270111 | A1 | 10/2012 | Li |

FOREIGN PATENT DOCUMENTS

| | | | |
|---|---|---|---|
| JP | 2002-115177 | 4/2002 | |
| JP | 2002-115178 | 4/2002 | |
| JP | 2002-161467 | 6/2002 | |
| JP | 2002-161471 | 6/2002 | |
| JP | 2002-173866 | 6/2002 | |
| JP | 2002-339232 | 11/2002 | |
| JP | 2003-013359 | 1/2003 | |
| JP | 2004-060110 | 2/2004 | |
| JP | 2005-131484 | 5/2005 | |
| JP | 2005-131485 | 5/2005 | |
| JP | 3780916 | 5/2006 | |
| JP | 2009-221618 | 10/2009 | |
| JP | 20092211618 | * 10/2009 | ............. B01D 39/14 |
| WO | WO 97-07272 | 2/1997 | |
| WO | WO 01-07144 | 2/2001 | |
| WO | WO 2009-148744 | 12/2009 | |
| WO | WO 2010-114742 | 10/2010 | |

OTHER PUBLICATIONS

Brown, "Capture of Dust Particles in Filters by Line-Dipole Charged Fibers", Journal of Aerosol Science, 1981, vol. 12, No. 4, pp. 349-356.

Davies, "The Separation of Airborne Dust and Particles," Institution of Mechanical Engineers, Proceedings 1B, 1952, pp. 185-213.

Macosko, Rheology: Principles, Measurements, and Applications (Wiley, John and Sons, Inc., 1994), p. 242, equation 6.2.12.

Neri, "Reaction of hals in polypropylene during light exposure: Part 1-iso-octane as reaction model compound-", Die Angewandte Makromolekulare Chemie (currently known as: Macromolecular Materials and Engineering)(3871), 1994, vol. 216, pp. 101-112.

Otani, "Initial Collection Efficiency of Electret Filter and Its Durability for Solid and Liquid Particles", Journal of Chemical Engineering Japan, 1993, vol. 11, pp. 207-214.

Waker, "Application of Cavity Theory to the Discharge of Electrostatic Dust Filters by x-Rays", Applied Radiation and Isotopes, 1988, vol. 39, No. 7, pp. 677-684.

Wente, "Manufacture of Superfine Organic Fibers", Naval Research Laboratories Report No. 4364, May 25, 1954, pp. 1-17.

Wente, "Superfine Thermoplastic Fibers," Industrial Engineering Chemistry, Aug. 1956, vol. 48, No. 8, pp. 1342-1346.

International Search Report for PCT/US2010/028290, mailed Oct. 28, 2010, 4 pages.

International Search Report for PCT/US2010/029157, mailed Nov. 12, 2010, 3 pages.

* cited by examiner

PROCESSING AIDS FOR OLEFINIC WEBS, INCLUDING ELECTRET WEBS

CROSS REFERENCE TO RELATED APPLICATIONS

This application is a national stage filing under 35 U.S.C. 371 of PCT/US2010/029157, filed Mar. 30, 2010, which claims priority to U.S. Provisional Application No. 61/166,411, filed Apr. 3, 2009, the disclosure of which is incorporated by reference in its/their entirety herein.

FIELD OF THE DISCLOSURE

This disclosure relates to processing aids for preparing webs, including non-woven fibrous webs such as non-woven thermoplastic microfiber webs, including electret webs containing charge-enhancing additives and methods for preparing and using them.

BACKGROUND

A variety of processing methods are used to process polymeric materials, especially polymeric olefinic materials, to prepare articles. Many of these processing methods involve the use of heat, pressure or a combination thereof. Examples of processing methods used include, for example, hot melt extrusion and injection molding. Among the articles prepared by hot melt extrusion techniques are polymeric webs. Examples of useful polymeric webs include films and non-woven fibrous webs. Among the uses for such polymeric webs are electret articles.

An electret is a dielectric material that exhibits a quasi-permanent electrical charge. Electrets are useful in a variety of devices including, e.g. cling films, air filters, filtering face-pieces, and respirators, and as electrostatic elements in electro-acoustic devices such as microphones, headphones, and electrostatic recorders.

The performance of microfibrous webs used for aerosol filtration can be improved by imparting an electrical charge to the fibers, forming an electret material. In particular, electrets are effective in enhancing particle capture in aerosol filters. A number of methods are known for forming electret materials in microfibrous webs. Such methods include, for example, bombarding melt-blown fibers as they issue from the die orifices, as the fibers are formed, with electrically charged particles such as electrons or ions. Other methods include, for example, charging the fibers after the web is formed, by means of a DC corona discharge or imparting a charge to the fiber mat by means of carding and/or needle tacking (tribo-charging). Recently, a method in which jets of water or a stream of water droplets impinge on a non-woven web at a pressure sufficient to provide filtration enhancing electret charge has been described (hydrocharging).

SUMMARY

In this disclosure, methods for preparing polymeric webs are presented. Among the polymeric webs disclosed are electret webs.

In some embodiments a method of preparing a web is disclosed comprising preparing a blend comprising a thermoplastic resin, and a processing aid, the processing aid comprising a hindered amine N-substituted succinimide oligomer, hot melt mixing the blend, wherein the melt viscosity of the blend of the processing aid and the thermoplastic resin is lower than the melt viscosity of the thermoplastic resin without the processing aid; and forming a web from the hot melt blend.

In some embodiments, the polymeric web is an electret web, and the method comprises preparing a blend comprising a thermoplastic resin and a processing aid, the processing aid comprising a hindered amine N-substituted succinimide oligomer, hot melt mixing the blend, forming a web from the hot melt blend, and electrostatically charging the web.

Also disclosed are electret filter media comprising a non-woven microfiber web comprising a blend of a thermoplastic resin, and a charge-enhancing additive comprising a hindered amine N-substituted succinimide oligomer.

DETAILED DESCRIPTION

Methods for preparing polymeric webs are disclosed which are blends of thermoplastic resins and a processing aid. Typically the thermoplastic resins are polyolefinic materials. The processing aids permit more facile web formation. The processing aid is a hindered amine N-substituted succinimide oligomer. When the process aids are used to prepare electret webs, the processing aids also provide webs which can show enhanced properties over webs prepared with the thermoplastic resins alone. Thus, the processing aid not only aids in the processing of the thermoplastic resin but also serves as a charge-enhancing additive in the formed electret web.

The polymeric webs may be in a variety of forms. For example the web may be a continuous or discontinuous film, or a fibrous web. Fibrous webs are particularly useful for the formation of electret articles, such as filtration media. In some embodiments the web is a non-woven microfibrous web. Typically microfibers are 1-100 micrometers, or more typically 2-30 micrometers in effective diameter (or average diameter if measured by a method such as scanning electron microscopy) and the microfibers need not have a circular cross-section.

The terms "a", "an", and "the" are used interchangeably with "at least one" to mean one or more of the elements being described.

The term electret refers a material that exhibits a quasi-permanent electric charge.

As used herein the term "oligomer" refers to a compound with a limited number of repeating units. This is in contrast to a polymer which, at least in principle, contains an unbounded number of repeat units. Generally oligomers contain from 1 to 100 repeat units.

The term "hindered amine" refers to amine groups which are sterically hindered by substituent groups. Examples of hindered amines are described, for example, in U.S. Pat. No. 3,925,376 (Chalmers et al.).

The term "succinimide" refers to a heterocyclic imide of the general structure of Formula 1:

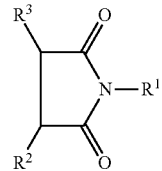

Formula 1 where $R^1$, $R^2$, and $R^3$ are all hydrogen atoms. The term "N-substituted succinimide" refers to molecules of Formula 1 where $R^1$ is a group other than hydrogen.

As used herein the terms "polyolefin" and "polyolefinic" when used to discuss polymers, refers to polymers prepared from olefin or alkene monomers. Polyolefin polymers include polypropylene-based polymers, polyethylene, poly-4-methyl-1-pentene, poly-cyclic olefins, and the like.

As used herein the terms "propylene-based" and "polypropylene-based" when used to discuss polymers, includes polypropylene homopolymers and propylene-containing copolymers where propylene is the major component.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl (t-butyl), n-pentyl, n-hexyl, cyclohexyl, n-heptyl, n-octyl, and ethylhexyl.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkynyl" refers to a monovalent group that is a radical of an alkyne, which is a hydrocarbon with at least one carbon-carbon triple bond. The alkynyl can be linear, branched, cyclic, or combinations thereof and typically contains 2 to 20 carbon atoms. In some embodiments, the alkynyl contains 2 to 18, 2 to 12, 2 to 10, 4 to 10, 4 to 8, 2 to 8, 2 to 6, or 2 to 4 carbon atoms. Exemplary alkynyl groups include ethynyl, n-propynyl, and n-butynyl.

The term "heteroalkyl" refers to an alkyl group which contains heteroatoms. These heteroatoms may be pendant atoms, for example, halogens such as fluorine, chlorine, bromine, or iodine or catenary atoms such as nitrogen, oxygen or sulfur. An example of a heteroalkyl group is a polyoxyalkyl group such as —$CH_2CH_2(OCH_2CH_2)_nOCH_2CH_3$.

The term "substituted alkyl" refers to an alkyl group which contains substituents along the hydrocarbon backbone. These substituents may be alkyl groups, heteroalkyl groups or aryl groups. An example of a substituted alkyl group is a benzyl group.

The term "aryl" refers to an aromatic carbocyclic group that is a radical containing 1 to 5 rings which may be connected or fused. The aryl group may be substituted with alkyl or heteroalkyl groups. Examples of aryl groups include phenyl groups, naphthalene groups and anthracene groups.

The term "alkylene" refers to a divalent group that is a radical of an alkane, which is a saturated hydrocarbon. The alkylene can be linear, branched, cyclic, or combinations thereof and typically has 1 to 20 carbon atoms. In some embodiments, the alkylene group contains 1 to 18, 1 to 12, 1 to 10, 1 to 8, 1 to 6, or 1 to 4 carbon atoms. Examples of alkylene groups include, but are not limited to, methylene (—$CH_2$—), ethylene (—$CH_2CH_2$—), and the like. Alkylene groups may be substituted with alkyl, aryl, heteroalkyl, substituted alkyl or substituted aryl groups.

The terms "polymer" and "polymeric material" refer to both materials prepared from one monomer such as a homopolymer or to materials prepared from two or more monomers such as a copolymer, terpolymer, or the like. Likewise, the term "polymerize" refers to the process of making a polymeric material that can be a homopolymer, copolymer, terpolymer, or the like. The terms "copolymer" and "copolymeric material" refer to a polymeric material prepared from at least two monomers.

The terms "room temperature" and "ambient temperature" are used interchangeably to mean temperatures in the range of 20° C. to 25° C.

The term "hot melt processable" as used herein, refers to a composition that can transform, for example, by heat and pressure from a solid to a viscous fluid. The composition should be capable of being hot melt processed without being substantially chemically transformed or rendered unusable for the intended application.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

Polymeric webs are typically prepared by hot melt processes, including blown microfiber (BMF) techniques. In hot melt processes which use an extruder, thermoplastic resins and desired additives are added to the heated extruder, subjected to heat, pressure and shear forces within the extruder and then exit the extruder through a die. The material properties of the thermoplastic resins determine the temperature, screw configuration, and screw speed suitable for extruding the resins, and therefore dictate the extrusion rate which can be achieved using that resin. In some hot melt extrusion processes processing aids are added which reduce the melt viscosity of the molten resin and therefore can provide for increased throughput, reduced processing temperatures, or even the ability to use resins which could not otherwise be used.

The processing aids of the present disclosure, when used with polyolefinic thermoplastic resins, reduce the hot melt viscosity of the molten thermoplastic resins and therefore permit more facile processing. Typically the reduction in hot melt viscosity provides three benefits to help control the rheology of materials during processing. These three benefits are: the ability to make polymeric webs faster; the ability to process materials at a lower temperature than otherwise possible without the process aid; and the ability to use materials that otherwise would not be practically processable.

Generally, the thermoplastic resin is a polyolefinic thermoplastic resin. The use of the processing aid causes a reduction in the hot melt viscosity of the polyolefinic thermoplastic resin. Typically, the last zone of the extruder is the highest temperature. It is desirable that this temperature is as low as possible. In some embodiments, the polyolefinic thermoplastic resin is polypropylene-based. In these embodiments, the benefits of the processing aid is typically more pronounced. Typically, many polypropylene-based thermoplastic resins are hot melt processed at a temperature of about 200-400° C. more typically 250-350° C. When the processing aid is used, the hot melt viscosity of the thermoplastic resin at a temperature of about 290° C. or higher is dramatically reduced from the viscosity of the thermoplastic resin alone. In some embodiments, the hot melt viscosity at a given temperature is reduced by 20%, 30%, or even 50% or more from that of the thermoplastic resin without process aid. This dramatic reduction of viscosity in the desired processing temperature range permits increased processing speed. The processing speed for producing polymeric webs is sometimes referred to as throughput, to describe the rate at which materials can pass through the extrusion process and produce polymeric webs.

Increasing the throughput permits the preparation of webs to be done at a faster rate, making for improved webs, reduced cost or both.

Besides increasing the processing speed, the use of the processing aid may also permit the use of lower temperature processing than would otherwise be possible or the use of materials which otherwise could not be used. Some grades of polypropylene-based polymers cannot be processed in the desirable processing temperature range described above. Some of these materials require much higher temperatures, even up to 400° C. or higher to achieve a processable viscosity. These temperatures are impractical or even impossible to achieve to prepare polymeric webs. Use of the processing aid may reduce the temperatures required to process these materials and permit materials to be used in processes where they otherwise would not be useful. For example, the use of a low melt flow polypropylene, such as a material with a melt flow index of less than 25, to make blown microfibers with an effective fiber diameter of 10 micrometers or less, would be commercially impractical without the use of a processing aid.

While not wishing to be bound by theory, it is believed that the processing aid causes a drop in the molecular weight of the polypropylene-based material which permits the drop in hot melt viscosity. This effect is very pronounced in the preparation of electret webs, especially microfiber electret webs prepared by melt-blown processes. With melt-blown processes a relatively low melt flow viscosity is desired to form fibers with an effective fiber diameter in the 1-100 micrometer range, especially to form fibers with an effective fiber diameter of below 10 micrometers.

Peroxide-based materials could be used as process aids to reduce the melt flow viscosity of olefinic polymers, especially polypropylene, but peroxide-based process aids are more problematic because of the inherent safety and handling issues associated with peroxides. An additional advantage of the process aids of the present disclosure is that, not only are they safer to handle and use, they also can function in many instances as antioxidants, providing an added benefit to the formed polymer web.

Since some embodiments of the materials used as process aids in this disclosure are sold as polymer stabilizers, it is surprising that they function as process aids for olefinic polymers. Even more surprising is that these process aids not only aid in the processing of polymeric webs, including electret webs, but they also function as charge-enhancing additives for the electret webs.

Among the useful polymeric webs which can be prepared by the methods of this disclosure are electret webs. Electret webs of the present disclosure comprise thermoplastic resins and processing aids which are blended and extruded. These processing aids have the unexpected added feature of serving as charge-enhancing additives in the formed electret webs.

Thermoplastic resins useful to prepare electret webs include any thermoplastic nonconductive polymer capable of retaining a high quantity of trapped electrostatic charge when formed into a web and charged. Typically, such resins have a DC (direct current) resistivity of greater than $10^{14}$ ohm·cm at the temperature of intended use. Polymers capable of acquiring a trapped charge include polyolefins such as polypropylene-based polymers, polyethylene, poly-cyclic olefins, and poly-4-methyl-1-pentene; polyvinyl chloride; polystyrene; polycarbonates; polyesters, including polylactides; and perfluorinated polymers and copolymers. Particularly useful materials include polypropylene-based polymers, poly-4-methyl-1-pentene, poly-cyclic olefins, blends thereof or copolymers formed from at least one of propylene and 4-methyl-1-pentene.

Generally, useful thermoplastic polymers are characterized by the description "melt flow index". The Melt Flow Index (MFI) is a measure of the ease of flow of the melt of a thermoplastic polymer. It is defined as the mass of polymer in grams flowing in 10 minutes through a capillary of specific diameter and length by a pressure applied via prescribed alternative gravimetric weights for alternative prescribed temperatures. The method is given in ASTM D1238 and ISO 1133. Typically the melt flow index for polypropylene is measured at 230° C.

Examples of suitable thermoplastic resins include, for example, the polypropylene resins: ESCORENE PP 3746G commercially available from Exxon-Mobil Corporation, Irving, Tex.; TOTAL PP3960, TOTAL PP3860, and TOTAL PP3868 commercially available from Total Petrochemicals USA Inc., Houston, Tex.; and METOCENE MF 650W commercially available from LyondellBasell Industries, Inc., Rotterdam, Netherlands; the poly-4-methyl-1-pentene resin: TPX-MX002 commercially available from Mitsui Chemicals, Inc., Tokyo, Japan; and the poly-cyclic olefin resin: TOPAS-6013 commercially available from TOPAS Advanced Polymers, Frankfurt, Germany.

The processing aids are hindered amine N-substituted succinimide oligomers. The hindered amine N-substituted succinimide oligomers can be described as having repeat units with the general structure of Formula 2, shown below:

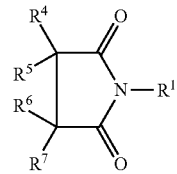

Formula 2 wherein the group $R^1$ comprises a hindered amine group;
the groups $R^4$ and $R^7$ independently comprise alkylene or substituted alkylene linking groups, linking to another succinimide ring or are alkyl terminal groups;
the groups $R^5$ and $R^6$ independently comprise a hydrogen atom, an alkyl, an alkenyl, an alkynyl, an aryl, a heteroalkyl, a substituted alkyl, or a substituted aryl. Generally the processing aids contain 1 or more repeat units, generally 100 or fewer repeat units, that is to say, the $R^4$ and $R^7$ groups link together up to 100 units of Formula 2. In some embodiments the processing aid comprises 50, 30 or fewer repeat units, 25 or fewer repeat units, 20 or fewer repeat units, or even 10 or fewer repeat units.

A variety of different materials that are described by Formula 2 are useful as processing aids that also function as charge-enhancing additives. Such additives are sometimes referred to as "succinimides" because when $R^1$, $R^4$, $R^5$, $R^6$, and $R^7$ in Formula 2 are hydrogen atoms, the molecule is known as succinimide. Suitable succinimides include, for example, succinimides of Formula 2 where $R^1$ comprises a hindered amine group. Typically these hindered amine groups are cyclic groups with alkyl groups which sterically block the amine nitrogen.

The $R^5$ and $R^6$ groups of Formula 2 can independently be hydrogen atoms, alkyl, alkenyl, alkynyl, aryl, heteroalkyl, substituted alkyl, or substituted aryl groups. Typically they are hydrogen atoms. The groups $R^4$ and $R^7$ independently comprise alkylene or substituted alkylene linking groups, linking to another succinimide ring or alkyl terminal groups. In some embodiments the processing aid which functions as a charge-enhancing additive where $R^1$ comprises an alkyl substituted 6-membered heterocyclic ring such as 2,2,6,6-tetramethyl piperidine group where the $R^1$ group is linked to the N atom of the succinimide ring at the 3, 4, or 5 position on the piperidine ring. In a particularly suitable embodiment, the processing aid that functions as a charge-enhancing additive is commercially available as "UVINUL 5050H" from BASF, Ludwigshafen, Germany. The structure of this additive is shown in Formula 3 (below). This material is reported to have a molecular weight of 3,000-4,000 grams/mole which implies that the number of repeat units, n, for this oligomer is about 5-7.

Formula 3

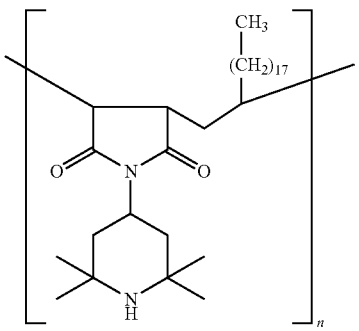

Typically the processing aid is blended with the thermoplastic resin in amounts of up to about 10%, more typically in the range of 0.1 to 5% by weight based upon the total weight of the blend. In some embodiments, the processing aid is present in an amount ranging from 0.1 to 3% by weight or 0.25 to 2% by weight.

The blend of the thermoplastic resin and the processing aid can be prepared by well-known methods. Typically, the blend is processed using melt extrusion techniques, so the blend may be preblended to form pellets in a batch process, or the thermoplastic resin and the processing aid may be mixed in the extruder in a continuous process. Where a continuous process is used, the thermoplastic resin and the processing aid may be pre-mixed as solids or added separately to the extruder and allowed to mix in the molten state.

Examples of melt mixers that may be used to form preblended pellets include those that provide dispersive mixing, distributive mixing, or a combination of dispersive and distributive mixing. Examples of batch methods include those using a BRABENDER (e.g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). After batch mixing, the mixture created may be immediately quenched and stored below the melting temperature of the mixture for later processing.

Examples of continuous methods include single screw extruding, twin screw extruding, disk extruding, reciprocating single screw extruding, and pin barrel single screw extruding. The continuous methods can include utilizing both distributive elements, such as cavity transfer mixers (e.g. CTM, commercially available from RAPRA Technology, Ltd.; Shrewsbury, England) and pin mixing elements, static mixing elements or dispersive mixing elements (commercially available from e.g., MADDOCK mixing elements or SAXTON mixing elements).

Examples of extruders that may be used to extrude preblended pellets prepared by a batch process include the same types of equipment described above for continuous processing. Useful extrusion conditions are generally those which are suitable for extruding the resin without the processing aid, although as previously discussed, use of the processing aid gives greater flexibility in the choice of processing conditions.

The extruded blend of thermoplastic resin and processing aid may be cast or coated into films or sheets or may be melt-blown into non-woven fibrous webs using known techniques. Melt-blown, non-woven microfibrous webs are particularly useful as filtration media.

Melt-blown, non-woven microfibrous electret filters are especially useful as an air filter element of a respirator, such as a filtering facepiece, or for such purposes as home and industrial air-conditioners, air cleaners, vacuum cleaners, medical air line filters, and air conditioning systems for vehicles and common equipment, such as computers, computer disk drives and electronic equipment. In some embodiments, the electret filters are combined with a respirator assembly to form a respiratory device designed to be used by a person. In respirator uses, the electret filters may be in the form of molded, pleated, or folded half-face respirators, replaceable cartridges or canisters, or prefilters.

Melt-blown microfibers useful in the present disclosure can be prepared as described in Van A. Wente, "Superfine Thermoplastic Fibers," Industrial Engineering Chemistry, vol. 48, pp. 1342-1346 and in Report No. 4364 of the Naval Research Laboratories, published May 25, 1954, entitled "Manufacture of Super Fine Organic Fibers" by Van A. Wente et al.

Useful melt-blown microfibers for fibrous electret filters typically have an effective fiber diameter of from about 1-100 micrometers, more typically 2 to 30 micrometers, in some embodiments from about 7 to 15 micrometers, as calculated according to the method set forth in Davies, C. N., "The Separation of Airborne Dust and Particles," Institution of Mechanical Engineers, London, Proceedings 1B, 1952.

Staple fibers may also be present in the web. The presence of staple fibers generally provides a more lofty, less dense web than a web of only blown microfibers. Generally, no more than about 90 weight percent staple fibers are present, more typically no more than about 70 weight percent. Examples of webs containing staple fiber are disclosed in U.S. Pat. No. 4,118,531 (Hauser).

Sorbent particulate material such as activated carbon or alumina may also be included in the web. Such particles may be present in amounts up to about 80 volume percent of the contents of the web. Examples of particle-loaded webs are described, for example, in U.S. Pat. No. 3,971,373 (Braun), U.S. Pat. No. 4,100,324 (Anderson) and U.S. Pat. No. 4,429,001 (Kolpin et al.).

Various optional additives can be blended with the thermoplastic composition including, for example, pigments, light stabilizers, primary and secondary antioxidants, metal deactivators, hindered amines, hindered phenols, fatty acid metal salts, triester phosphites, phosphoric acid salts, fluorine-containing compounds and combinations thereof. In addition, other charge-enhancing additives may be combined with the thermoplastic composition. Possible charge additives include thermally stable organic triazine compounds or oligomers, which compounds or oligomers contain at least one nitrogen atom in addition to those in the triazine ring, see, for example, U.S. Pat. Nos. 6,268,495, 5,976,208, 5,968,635, 5,919,847, and 5,908,598 to Rousseau et al. Another additive known to enhance electrets is "CHIMASSORB 944 LF: (poly[[6-(1,1, 3,3,-tetramethylbutyl)amino]-s-triazine-2,4-diyl]][(2,2,6,6-tetramethyl-4-piperidyl)imino] hexamethylene [(2,2,6,6-tetramethyl-4-piperidyl)imino]]), available from Ciba Specialty Chemicals, Inc. The charge-enhancing additives may be N-substituted amino aromatic compounds, particularly triamino substituted compounds, such as 2,4,6-trianilino-p-(carbo-2'-ethylhexyl-1'-oxy)-1,3,5-triazine commercially available as "UVINUL T-150" from BASF, Ludwigshafen, Germany. Another charge additive is 2,4,6-tris-(octadecylamino)-triazine, also known as tristearyl melamine ("TSM"). Further examples of charge-enhancing additives are provided in U.S. Patent Application Ser. No. 61/058,029, U.S. Patent Application Ser. No. 61/058,041, U.S. Pat. No. 7,390,351 (Leir et al.), U.S. Pat. No. 5,057,710 (Nishiura et al.), and U.S. Pat. Nos. 4,652,282 and 4,789,504 (Ohmori et al.).

In addition the web may be treated to chemically modify its surface. Surface fluorination can be achieved by placing a polymeric article in an atmosphere that contains a fluorine-containing species and an inert gas and then applying an electrical discharge to modify the surface chemistry of the polymeric article. The electrical discharge may be in the form of a plasma such as an AC corona discharge. This plasma fluorination process causes fluorine atoms to become present on the surface of the polymeric article. The plasma fluorination process is described in a number of U.S. Pats. Nos. 6,397,458, 6,398,847, 6,409,806, 6,432,175, 6,562,112, 6,660,210, and 6,808,551 to Jones/Lyons et al. Electret articles that have a high fluorosaturation ratio are described in U.S. Pat. No. 7,244,291 to Spartz et al., and electret articles that have a low fluorosaturation ratio, in conjunction with heteroatoms, is described in U.S. Pat. No. 7,244,292 to Kirk et al. Other publications that disclose fluorination techniques include: U.S. Pat. Nos. 6,419,871, 6,238,466, 6,214,094, 6,213,122, 5,908,598, 4,557,945, 4,508,781, and 4,264,750; U.S. Publications US 2003/0134515 A1 and US 2002/0174869 A1; and International Publication WO 01/07144.

The electret filter media prepared according to the present disclosure generally have a basis weight (mass per unit area) in the range of about 10 to 500 g/m$^2$, and in some embodiments, about 10 to 100 g/m$^2$. In making melt-blown microfiber webs, the basis weight can be controlled, for example, by changing either the collector speed or the die throughput. The thickness of the filter medium is typically about 0.25 to 20 millimeters, and in some embodiments, about 0.5 to 2 millimeters. Multiple layers of fibrous electret webs are commonly used in filter elements. The solidity of the fibrous electret web typically is about 1% to 25%, more typically about 3% to 10%. Solidity is a unitless parameter that defines the solids fraction of the web. Generally the methods of this disclosure provide electret webs with generally uniform charge distribution throughout the web without regard to basis weight, thickness, or solidity of the medium. The electret filter medium and the resin from which it is produced should not be subjected to any unnecessary treatment which might increase its electrical conductivity, e.g., exposure to ionizing radiation, gamma rays, ultraviolet irradiation, pyrolysis, oxidation, etc.

The electret web may be charged as it is formed or the web may be charged after the web is formed. In electret filter media, the medium is generally charged after the web is formed. In general, any standard charging method known in the art may be used. For example, charging may be carried out in a variety of ways, including tribocharging, DC corona discharge or hydrocharging. A combination of methods may also be used.

Examples of suitable DC corona discharge processes are described in U.S. Pat. Re. No. 30,782 (van Turnhout), U.S. Pat. Re. No. 31,285 (van Turnhout), U.S. Pat. Re. No. 32,171 (van Turnhout), U.S. Pat. No. 4,215,682 (Davis et al.), U.S. Pat. No. 4,375,718 (Wadsworth et al.), U.S. Pat. No. 5,401,446 (Wadsworth et al.), U.S. Pat. No. 4,588,537 (Klaase et al.), U.S. Pat. No. 4,592,815 (Nakao) and U.S. Pat. No. 6,365,088 (Knight et al.).

Hydrocharging of the web is carried out by impinging jets of water or a stream of water droplets onto the web at a pressure sufficient to provide the web with filtration enhancing electret charge. The pressure necessary to achieve optimum results varies depending on the type of sprayer used, the type of polymer from which the web is formed, the type and concentration of additives to the polymer, the thickness and density of the web and whether pre-treatment, such as DC corona surface treatment, was carried out prior to hydrocharging. Generally, water pressures in the range of about 10 to 500 psi (69 to 3450 kPa) are suitable. DC corona surface treatment could also be used as a post-hydrocharging treatment, if desired, but such a post-treatment is not typical.

The jets of water or stream of water droplets can be provided by any suitable spray means. An apparatus useful for hydraulically entangling fibers is generally useful in the method of the present disclosure, although operation is carried out at lower pressures in hydrocharging than generally used in hydroentangling. Hydrocharging is understood to include the method described in U.S. Pat. No. 5,496,507 (Angadjivand) and other various derivative methods for imparting an electret charge using the fluid wetting and dewetting process as described in, for example, Japanese Patent Application Number JP 2002161467 (Horiguchi), Japanese Patent Application Number JP 2002173866 (Takeda), Japanese Patent Application Number JP 2002115177 (Takeda), Japanese Patent Application Number JP 2002339232 (Takeda), Japanese Patent Application Number JP 2002161471 (Takeda), Japanese Pat. No. 3,780,916 (Takeda), Japanese Patent Application Number JP 2002115178 (Takeda), Japanese Patent Application Number JP 2003013359 (Horiguchi), U.S. Pat. No. 6,969,484 (Horiguchi), U.S. Pat. No. 6,454,986 (Eitzman), Japanese Patent Application Number JP 2004060110 (Masumori), Japanese Patent Application Number JP 2005131485 (Kodama), and Japanese Patent Application Number JP 2005131484 (Kodama).

The hydrocharging of the web may also be carried out using a new method disclosed in the US patent application entitled "Method of Making Electret Articles Based On Zeta Potential" (U.S. Ser. No. 12/131,770) filed Jun. 2, 2008. The method comprises: (a) providing a polymeric article to be charged; and (b) contacting the polymeric article to be charged with an aqueous liquid that has a pH and conductivity as follows: (i) if the article has a zeta potential of less than −7.5 millivolts (mV), then the contacting water has a conductivity of about 5 to 9,000 microSiemens per centimeter (microS/cm) and a pH greater than 7; and (ii) if the article has a zeta potential of greater than −7.5 mV, then the contacting water has a conductivity of about 5 to 5,500 micro Siemens per centimeter (microS/cm) and a pH of 7 or less. The article may be dried actively (with a vacuum or heat) or passively (hang drying) or combinations thereof.

To model filtration performance, a variety of filtration testing protocols have been developed. These tests include measurement of the aerosol penetration of the filter web using a standard challenge aerosol such as dioctylphthalate (DOP), which is usually presented as percent of aerosol penetration through the filter web (% Pen) and measurement of the pressure drop across the filter web (ΔP). From these two measurements, a quantity known as the Quality Factor (QF) may be calculated by the following equation:

$$QF = -\ln(\% \text{ Pen}/100)/\Delta P,$$

where ln stands for the natural logarithm. A higher QF value indicates better filtration performance, and decreased QF values effectively correlate with decreased filtration performance. Details for measuring these values are presented in the Examples section. Typically, the filtration media of this disclosure have measured QF values of 0.3 (mm of $H_2O$)$^{-1}$ or greater at a face velocity of 6.9 centimeters per second.

To verify that a particular filter medium is electrostatically charged in nature, one may examine its performance before and after exposure to ionizing X-ray radiation. As described in the literature, for example, *Air Filtration* by R. C. Brown (Pergamon Press, 1993) and "Application of Cavity Theory to the Discharge of Electrostatic Dust Filters by X-Rays", A. J. WAKER and R. C. BROWN, *Applied Radiation and Isotopes*, Vol. 39, No. 7, pp. 677-684, 1988, if an electrostatically charged filter is exposed to X-rays, the penetration of an aerosol through the filter will be greater after exposure than before exposure, because the ions produced by the X-rays in the gas cavities between the fibers will have neutralized some of the electric charge. Thus, a plot of penetration against cumulative X-ray exposure can be obtained which shows a steady increase up to a constant level after which further irradiation causes no change. At this point all of the charge has been removed from the filter.

These observations have led to the adoption of another testing protocol to characterize filtration performance, the X-ray Discharge Test. In this testing protocol, select pieces of the filter medium to be tested are subjected to X-ray radiation to discharge the electret web. One attribute of this test is that it confirms that the web is an electret. Because it is known that X-rays quench electret charge, exposure of a filter media to X-rays and measuring the filter performance before and after this exposure and comparing the filter performances indicates whether the filter media is an electret. If the filter performance is unchanged after exposure to X-ray radiation, that is indicative that no charge was quenched and the material is not an electret. However, if the filter performance diminishes after exposure to X-ray radiation, that is indicative that the filter media is an electret.

When the test is run, typically, the filtration performance is measured before and after exposure of the filter medium to the X-ray radiation. A % Penetration Ratio can be calculated according to the following equation: % Penetration Ratio=(ln (initial % DOP Penetration/100)/(ln (% DOP Penetration after 60 min of X-ray exposure)))×100, when tested according to the Filtration Performance Test Method, as described in the Examples section below. In order for the web to have sufficient charge for use as a filter, the % Penetration Ratio is typically at least 300%. As the % Penetration Ratio increases, the filtration performance of the web also increases. In some embodiments, the % Penetration Ratio is at least 400%, 500%, or 600%. In preferred embodiments, the % Penetration Ratio is at least 750% or 800%. In some embodiments, the web exhibits a % Penetration Ratio of at least 1000%, or at least 1250%.

The initial Quality Factor (prior to exposure to X-rays) is typically at least 0.3 (mm of $H_2O$)$^{-1}$, more typically at least 0.4 or even 0.5 (mm of $H_2O$)$^{-1}$ for a face velocity of 6.9 cm/s when tested according to the Filtration Performance Test Method, as described in the Examples section below. In some embodiments, the initial Quality Factor is at least 0.6 or 0.7 (mm of $H_2O$)$^{-1}$. In other embodiments, the initial Quality Factor is at least 0.8, at least 0.90, at least 1.0, or even greater than 1.0 (mm of $H_2O$)$^{-1}$. The Quality Factor after 60 minutes exposure to X-rays is typically less than 50% of the initial Quality Factor. In some embodiments, the initial Quality Factor is at least 0.5 (mm of $H_2O$)$^{-1}$ or greater and the Quality Factor after 60 minutes exposure to X-rays is less than 0.15 (mm of $H_2O$)$^{-1}$.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| Additive-1 | 1-(2,2,6,6-tetramethyl-piperidin-4-yl)-pyrrolidine-2,5-dione derivative commercially available as "UVINUL 5050H" (CAS: 152261-33-1) from BASF, Ludwigshafen, Germany. |
| Additive-2 | N,N'-bisformyl-N,N'-bis(2,2,6,6-tetramethyl-4-piperidinyl)-hexamethylendiamine commercially available as "UVINUL 4050H" (CAS: 124172-53-8) from BASF, Ludwigshafen, Germany. |
| PP-1 | Polypropylene resin grade, TOTAL PP3860 (melt flow index 100), commercially available from Total Petrochemicals USA Inc., Houston, TX. |
| PP-2 | Polypropylene resin, TOTAL PP3868 (melt flow index 35), commercially available from Total Petrochemicals USA Inc., Houston, TX. |
| PP-3 | Polypropylene resin, ESCORENE PP 3746G (melt flow index 1200), commercially available from Exxon-Mobil Corporation, Irving, TX. |
| PMP-1 | Poly-4-methyl-l-pentene, TPX-MX002, commercially available from Mitsui Chemicals, Inc. Tokyo, Japan. |
| COC-1 | Cyclic olefin copolymer, TOPAS-6013, commercially available from TOPAS Advanced Polymers, Frankfurt, Germany. |
| DI water | Deionized water |
| BMF | Melt blown microfiber web |

Test Methods
Viscosity Measurements

Two different techniques were used to measure viscosity. These are defined as Viscosity Measurement Method-1 and Viscosity Measurement Method-2.

a) Viscosity Measurement Method 1—Capillary Rheometer

A capillary rheometer with the orifice diameter of 0.318 centimeter (0.125 inch) and the length of 20.3 centimeters (8 inches) was connected to a BRABENDER B-K extruder with conical twin-screw (available from Brabender Instruments, Inc.). The extruder was operated at an extrusion rate 0.9 to 3.6 kg/hr (2-8 lb/hr) and temperatures from 250-310° C.

To generate the viscosity data of the experimental samples, additives were dry blended with polymer resins at the desired concentration by weight, and the blends were extruded at the temperatures and rates specified in Table 3. Comparative examples were prepared from the corresponding lots of polymer, but with no additive included. Table 3 summarizes the experimental results for each of the examples.

The apparent viscosity and shear rate of the samples can be calculated from the pressure drop and flow rate of the samples through the capillary rheometer assuming a Newtonian fluid.

This is described, for example, in Rheology: Principles, Measurements, and Applications (Wiley, John and Sons, Inc., 1994) by Chris Macosko, p. 242, equation 6.2.12. Experimental data were input into the following equation to calculate apparent viscosity. The melt density for polypropylene was assumed to be 0.91 grams/cm³. Equation to calculate apparent viscosity:

$$\mu_{app} \equiv \frac{\pi D^4 \Delta P}{128 Q L}$$

D: Capillary diameter (0.3175 cm in this case)
ΔP: Pressure drop during the measurement of viscometer (g/(cm·s²))
Q: Volumetric flow rate (cm³/second; cm³/s) or mass flow rate (grams/second; g/s) divided by density (W/ρ)
L: Capillary length (20.32 cm long in this case)
Shear rate of flow can be calculated by:

$$\gamma \equiv \frac{4Q_v}{\pi R^3} = \frac{32M}{\rho \pi D^3}$$

γ: Shear rate (1/second; s⁻¹)
$Q_v$: Volume rate through the capillary (cm³/second; cm³/s)
R: Radius of capillary size (0.1588 cm in this case)
D: Diameter of capillary (0.3175 cm in this case)
M: Mass flow rate (grams/second; g/s)
ρ: Density of flow materials (grams/cm³; g/cm³)
b) Viscosity Measurement Method 2—Parallel Plate Rheometer The viscosity changes of samples were measured using an ARES Rheometer (TA Instruments, New Castle, Del.). The samples used for rheology measurement were compounded using an Xplore 15 milliliter Micro-Compounder (DSM Xplore, Geleen, The Netherlands). The examples and comparative examples were compounded under the same thermal history to avoid thermal history effects on the viscosity. Samples containing PP-1 and PP-2 were compounded at 220° C. for 6 minutes. Samples containing PMP-1 were compounded at 280° C. for 6 minutes, and samples containing COC-1 were compounded at 260° C. for 6 minutes. All the samples were hot pressed into films at their compounding temperature with the thickness of from 0.6 to 1.0 millimeters. These rheology samples were die-cut to 25 millimeter diameter disks. The sample disks were loaded into two parallel plates of the rheometer (31.5 millimeter aluminum pan and 25 millimeter plate). The dynamic shear viscosity was measured with a temperature sweep from 180° C. to 350° C. and back to 180° C. for PP-1 and PP-2 samples; from 220° C. to 350° C. and back to 220° C. for COC-1 samples and from 250° C. to 350° C. and back to 250° C. for PMP-1 samples with frequency of 1 Hz (dynamic shear rate, 6.28 rad/sec). The dynamic viscosity of the samples versus time was also measured at constant temperature (300, 320, 330 and 340° C.) under the frequency of 1 Hz for 15 minutes. The viscosity data after 10 minutes were chosen and used as the viscosity data of the examples and comparative examples, which are presented in Table 3.

Filtration Testing

The samples were tested for % DOP aerosol penetration (% Pen) and pressure drop (ΔP), and the Quality Factor (QF) was calculated. The filtration performance (% Pen and QF) of the nonwoven microfiber webs were evaluated using an Automated Filter Tester (AFT) Model 8130 (available from TSI, Inc., St. Paul, Minn.) using dioctylphthalate (DOP) as the challenge aerosol. The DOP aerosol is nominally a monodisperse 0.3 micrometer mass median diameter having an upstream concentration of 70-120 mg/m³. The aerosol was forced through a sample of filter media at a calibrated flow rate of 42.5 liters/minute (face velocity of 6.9 cm/s) with the TSI AFT Model 8130 aerosol neutralizer turned off. The total testing time was 23 seconds (rise time of 15 seconds, sample time of 4 seconds, and purge time of 4 seconds). Simultaneously with % Pen, the pressure drop (ΔP in mm of water) across the filter was measured by the instrument. The concentration of DOP aerosol was measured by light scattering both upstream and downstream of the filter media using calibrated photometers. The DOP % Pen is defined as: % Pen=100× (DOP concentration downstream/DOP concentration upstream). For each material, 6 separate measurements were made at different locations on the BMF web and the results were averaged.

The % Pen and ΔP were used to calculate a QF by the following formula:

QF=−ln(% Pen/100)/ΔP, where ln stands for the natural logarithm. A higher QF value indicates better filtration performance and decreased QF values effectively correlate with decreased filtration performance.

X-ray Discharge Test

The Quality Factor and % Penetration of sample webs to be tested were determined prior to exposure to X-ray radiation using the test method described above. The Initial Quality Factor is designated as "$QF_0$". The sample web was exposed on each side to X-rays using the system described below, ensuring that the entire sample was uniformly exposed to the X-ray radiation. After X-ray exposure, the sample of filter media was tested again to measure its filter performance (QF and % Pen). The procedure was repeated until the filter performance reached a plateau value, indicating all of the sample's electrostatic charge had been neutralized. The % Penetration Ratio (% Pen Ratio) is also reported. The % Pen Ratio was calculated from the % Pen at 0 minutes and 60 minutes using the equation where ln stands for the natural logarithm:

$$\% \text{ Pen Ratio} = \frac{\ln(\% \text{ Pen}(0 \text{ min})/100)}{\ln(\% \text{ Pen }(60 \text{ min})/100)} \times 100\%.$$

X-ray exposure was carried out using a Baltograph 100/15 CP (Balteau Electric Corp., Stamford, Conn.) X-ray exposure system consisting of a constant potential end grounded generator rated at 100 KV at 10 mA with a beryllium window (0.75 mm inherent filtration) with an output of up to 960 Roentgen/min at 50 cm from the focal spot of 1.5 mm×1.5 mm was employed. The voltage was set to 80 KV with a corresponding current of 8 mA. A sample holder was set up at an approximate distance of 57.2 centimeters (22.5 inches) from the focal spot to produce an exposure of about 580 Roentgen/min.

Thermal Stability Analysis:

The thermal stability of each processing aid was measured with a Thermogravimetric Analyzer (TGA) Model 2950 available from TA Instruments, New Castle, Del. Approximately 5-10 milligrams of material was placed in the TGA and heated from room temperature to 500° C. at a rate of 10° C./min under an air environment while the weight loss was measured. Table A lists the temperature at which 2% weight loss was detected as well as the temperature at which 5% weight loss was detected.

TABLE A

| Additive | Temperature at 2% weight loss (° C.) | Temperature at 5% weight loss (° C.) |
|---|---|---|
| 1 | 268 | 335 |
| 2 | 265 | 289 |

Examples 1-20 and Comparative Examples C1-C12

For each of the Examples and Comparative Examples, the procedures described below were followed. The data for these Examples are presented in Tables 1 and 2.

Sample Preparation:
Step A—Preparation of Microfiber Webs:

For each Example Web 1-9, Additive 1 was dry blended with one of the grades of polypropylene, or poly-4-methyl-1-pentene at the concentration shown in Table 1, and the blend was extruded as described in Van A. Wente, "Superfine Thermoplastic Fibers," Industrial Engineering Chemistry, vol. 48, pp. 1342-1346. The extrusion temperature ranged from about 250° C.-340° C. and the extruder was a BRABENDER conical twin-screw extruder (commercially available from Brabender Instruments, Inc.) operating at a rate of about 2.5 to 3 kg/hr (5-7 lb/hr). The die was 25.4 centimeters (10 inches) wide with 10 holes per centimeter (25 holes per inch). Melt blown microfiber (BMF) webs were formed having basis weights of about 57 g/m², effective fiber diameters of about 8.0 micrometers and a thickness of about 1 millimeter. Likewise, for each Comparative Example C1-C6, a BMF web was prepared from the same grade of polypropylene or poly-4-methyl-1-pentene as the corresponding Examples web, but either no additive was added or Additive-2 was added. Table 1 summarizes the specific web characteristics for each of the Examples and Comparative Examples.

Step B—Electret Preparation:

Each of the BMF webs prepared in Example 1-10 and C1-C6 in Step A above was charged by the charging method shown below.

Charging Method 1:

The selected BMF webs prepared in Step A above were charged by hydrocharging with DI water. The BMF web was hydrocharged using a fine spray of DI water generated from a nozzle operating at a pressure of 896 kiloPascals (130 psig) and a flow rate of approximately 1.4 liters/minute. The selected BMF webs prepared in Step A were conveyed by a porous belt through the water spray at a speed of approximately 10 centimeters/second while a vacuum simultaneously drew the water through the web from below. Each BMF web was run through the hydrocharger twice (sequentially once on each side) while spraying, and then twice without spraying with just the vacuum to remove any excess water. The webs were allowed to dry completely in air overnight prior to filter testing.

Filtration Testing Procedure:
Initial Filtration Performance:

Each of the charged samples prepared in Step B above was cut into a 1 meter section, this section was tested in its initial state for % DOP aerosol penetration (% DOP Pen) and pressure drop (ΔP), and the Quality Factor (QF) was calculated as described in the Test Methods given above. These results are reported in Table 2 below as % DOP Pen, Pressure Drop and QF.

TABLE 1

| Example | Additive | Resin Grade | Additive Concn. (wt %) | Eff. Fiber Diam. (μm) | Solidity (%) | Basis Weight (g/m²) | Thickness (mm) |
|---|---|---|---|---|---|---|---|
| C1 | none | PP-1 | 0 | 8.1 | 5.4 | 60 | 1.20 |
| 1 | 1 | PP-1 | 0.1 | 7.9 | 5.9 | 58 | 1.09 |
| 2 | 1 | PP-1 | 0.2 | 8.3 | 6.1 | 60 | 1.08 |
| 3 | 1 | PP-1 | 0.5 | 8.2 | 6.1 | 60 | 1.08 |
| 4 | 1 | PP-1 | 0.75 | 8.1 | 6.2 | 57 | 1.01 |
| 5 | 1 | PP-1 | 1.0 | 7.9 | 6.1 | 59 | 1.04 |
| C2 | none | PP-2 | 0 | 8.3 | 56 | 7.1 | 0.85 |
| 6 | 1 | PP-2 | 0.5 | 7.7 | 58 | 7.5 | 0.85 |
| 7 | 1 | PP-2 | 1 | 7.5 | 57 | 6.7 | 0.93 |
| C3 | none | PMP-1 | 0 | 8.1 | 55 | 7.3 | 0.89 |
| 8 | 1 | PMP-1 | 0.5 | 9.3 | 58 | 7.8 | 0.88 |
| 9 | 1 | PMP-1 | 1 | 9.2 | 55 | 7.4 | 0.88 |
| C4 | 2 | PP-3 | 0.5 | 8.0 | 5.3 | 55 | 1.14 |
| C5 | 2 | PP-3 | 1 | 8.1 | 5.6 | 55 | 1.06 |
| C6 | none | PP-3 | 0 | 8.0 | 5.5 | 57 | 1.0 |
| 10 | 1 | PP-3 | 1 | 8.1 | 5.8 | 55 | 1.03 |

TABLE 2

| Example Number | Resin Grade | Additive concn. (wt %) | BMF Web Example Number | % DOP Pen. | Pressure Drop (mm H₂O) | QF (1/mm H₂O) |
|---|---|---|---|---|---|---|
| C7 | PP-1 | none | C1 | 32.82 | 2.58 | 0.43 |
| 11 | PP-1 | 0.1 | 1 | 8.17 | 2.36 | 1.07 |
| 12 | PP-1 | 0.2 | 2 | 5.56 | 2.24 | 1.32 |
| 13 | PP-1 | 0.5 | 3 | 19.82 | 1.72 | 0.95 |
| 14 | PP-1 | 0.75 | 4 | 1.46 | 2.16 | 1.99 |
| 15 | PP-1 | 1.0 | 5 | 1.69 | 2.34 | 1.79 |
| C8 | PP-2 | none | C2 | 35.66 | 2.26 | 0.46 |
| 16 | PP-2 | 0.5 | 6 | 0.68 | 2.84 | 1.77 |
| 17 | PP-2 | 1.0 | 7 | 0.289 | 3.0 | 1.96 |
| C9 | PMP-1 | none | C3 | 14.98 | 2.16 | 0.88 |
| 18 | PMP-1 | 0.5 | 8 | 6.17 | 2.06 | 1.36 |
| 19 | PMP-1 | 1.0 | 9 | 3.55 | 2.18 | 1.54 |
| C10 | PP-3 | 0.5 | C4 | 29.42 | 2.54 | 0.48 |
| C11 | PP-3 | 1 | C5 | 29.88 | 2.26 | 0.54 |
| C12 | PP-3 | 0 | C6 | 34.66 | 1.96 | 0.55 |
| 20 | PP-3 | 1 | 10 | 2 | 3.4 | 1.69 |

Examples 21-25 and Comparative Examples C13-C16

For each of the Examples and Comparative Examples presented below, the samples and testing was carried out as described using the Viscosity Testing Methods described above. The data are presented in Table 3.

TABLE 3

| Example Number | Resin Grade | Additive Concn. (wt %) | Temp. (° C.) | Viscosity (Poise) | Shear Rate (s⁻¹) | Viscosity Measurement Method |
|---|---|---|---|---|---|---|
| C13 | PP-1 | none | 250 | 336 | 265 | 1 |
| | | | 270 | 211 | | |
| | | | 290 | 127 | | |
| | | | 310 | 65 | | |
| | | | 330 | 7.52 | 6.28 | 2 |
| 21 | PP-1 | 0.5 | 330 | 7.34 | 6.28 | 2 |
| 22 | PP-1 | 1.0 | 250 | 378 | 265 | 1 |

TABLE 3-continued

| Example Number | Resin Grade | Additive Concn. (wt %) | Temp. (°C.) | Viscosity (Poise) | Shear Rate (s⁻¹) | Viscosity Measurement Method |
|---|---|---|---|---|---|---|
| | | | 270 | 237 | | |
| | | | 290 | 96 | | |
| | | | 310 | 33 | | |
| | | | 330 | 5.75 | 6.28 | 2 |
| C14 | PP-2 | none | 310 | 254 | 353 | 1 |
| | | | 330 | 35.6 | 6.28 | 2 |
| 23 | PP-2 | 1.0 | 310 | 205 | 353 | 1 |
| | | | 330 | 18.4 | 6.28 | 2 |
| C15 | PMP-1 | none | 250 | 17757 | 6.28 | 2 |
| | | | 270 | 11937 | | |
| | | | 290 | 6421 | | |
| | | | 310 | 1891 | | |
| | | | 330 | 266 | | |
| 24 | PMP-1 | 1.0 | 250 | 10959 | 6.28 | 2 |
| | | | 270 | 6989 | | |
| | | | 290 | 3861 | | |
| | | | 310 | 1375 | | |
| | | | 330 | 166 | | |
| C16 | COC-1 | none | 270 | 3936 | 6.28 | 2 |
| | | | 290 | 1827 | | |
| | | | 310 | 960 | | |
| | | | 330 | 600 | | |
| 25 | COC-1 | 1.0 | 270 | 2142 | 6.28 | 2 |
| | | | 290 | 1031 | | |
| | | | 310 | 460 | | |
| | | | 330 | 277 | | |

Example 26 and Comparative Examples C17

For Example 26, a sample of web prepared in Example 10 above was charged using hydrocharging (Charging Method-1) and exposed to ionizing X-rays according to the X-ray Discharge Test Method given above. For Comparative Example C17, the sample web prepared in Example 10 was used without charging, and the same test was carried out. The data are presented in Table 4.

TABLE 4

| | Filtration Performance after Exposure to X-rays | | | | | | | | | | | |
|---|---|---|---|---|---|---|---|---|---|---|---|---|
| | Exposure = 0 min | | | Exposure = 30 min | | | Exposure = 40 min | | | Exposure = 60 min | | % |
| Ex. No. | ΔP (mm H₂O) | % Pen (%) | QF₀ (1/mm H₂O) | ΔP (mm H₂O) | % Pen (%) | QF (1/mm H₂O) | ΔP (mm H₂O) | % Pen (%) | QF (1/mm H₂O) | ΔP (mm H₂O) | % Pen (%) | QF (1/mm H₂O) | Pen Ratio (%) |
| C17 | 2.1 | 79.9 | 0.11 | 2 | 79.5 | 0.11 | 2 | 79.5 | 0.11 | 2 | 79.3 | 0.12 | 97 |
| 26 | 2 | 3.4 | 1.69 | 2 | 42.7 | 0.43 | 2 | 57.2 | 0.28 | 2 | 73.7 | 0.15 | 1108 |

What is claimed is:

1. A method of preparing a web comprising:
   preparing a blend comprising:
   a thermoplastic resin; and
   a processing aid, the processing aid comprising a hindered amine N-substituted succinimide oligomer;
   hot melt mixing the blend, wherein the melt viscosity of the blend of the processing aid and the thermoplastic resin is lower than the melt viscosity of the thermoplastic resin without the processing aid at a temperature of 250° C. or higher; and
   forming a web from the hot melt blend.

2. The method of claim 1 wherein the processing aid comprises a material containing a repeat unit of the formula:

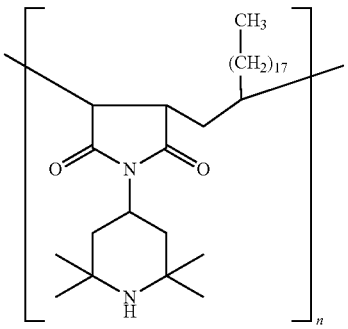

wherein the group $R^1$ comprises a hindered amine group;

the groups $R^4$ and $R^7$ independently comprise alkylene or substituted alkylene linking groups, linking to another succinimide ring or alkyl terminating groups;

the groups $R^5$ and $R^6$ independently comprise a hydrogen atom, an alkyl, an alkenyl, an alkynyl, an aryl, a heteroalkyl, a substituted alkyl, or a substituted aryl, wherein the material comprises up to 100 repeat units.

3. The method of claim 1 wherein the processing aid comprises a material of the formula:

where n is a number of about 5-7.

4. A method of preparing an electret web comprising:
   preparing a blend comprising:
   a thermoplastic resin; and
   a processing aid, the processing aid comprising a hindered amine N-substituted succinimide oligomer;
   hot melt mixing the blend, wherein the melt viscosity of the blend is lower than the melt viscosity of the thermoplastic resin without the processing aid at a temperature of 250° C. or higher;
   forming a web from the hot melt blend; and
   electrostatically charging the web.

5. The method of claim 4 wherein forming a web comprises melt blowing the hot melt blend to form a microfiber web.

6. The method of claim 4 wherein the processing aid comprises a material of the formula:

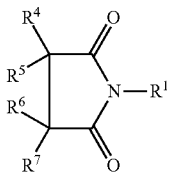

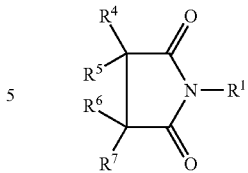

wherein the group $R^1$ comprises a hindered amine group;
the groups $R^4$ and $R^7$ independently comprise alkylene or substituted alkylene linking groups, linking to another succinimide ring or alkyl terminating groups;
the groups $R^5$ and $R^6$ independently comprise a hydrogen atom, an alkyl, an alkenyl, an alkynyl, an aryl, a heteroalkyl, a substituted alkyl, or a substituted aryl, wherein the material comprises up to 100 repeat units.

7. The method of claim 4 wherein the processing aid comprises a material of the formula:

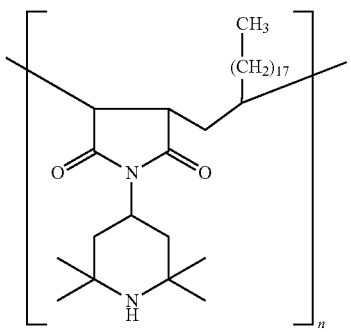

where n is a number of about 5-7.

8. The method of claim 4 wherein the thermoplastic resin comprises:
polyethylene, a polypropylene-based polymer; a poly-cyclic olefin; poly(4-methyl-1-pentene); copolymers of propylene and 4-methyl-1-pentene; or mixtures thereof.

9. The method of claim 4 wherein the processing aid comprises 0.1-5.0% by weight of the blend.

10. The method of claim 4 wherein the thermoplastic resin comprises polypropylene and the melt viscosity of the blend is lower than the melt viscosity of the thermoplastic resin without the processing aid at 290° C.

11. An electret filter medium comprising:
a non-woven microfiber web comprising a blend of:
a thermoplastic resin; and
a charge-enhancing additive comprising a hindered amine N-substituted succinimide oligomer, wherein the charge-enhancing additive comprises a material containing a repeat unit of the formula:

wherein the group $R^1$ comprises a hindered amine group;
the groups $R^4$ and $R^7$ independently comprise alkylene or substituted alkylene linking groups, linking to another succinimide ring or alkyl terminating groups;
the groups $R^5$ and $R^6$ independently comprise a hydrogen atom, an alkyl, an alkenyl, an alkenyl, an aryl, a heteroalkyl, a substituted alkyl, or a substituted aryl, wherein the material comprises up to 100 repeat units.

12. The electret filter medium of claim 11 wherein the non-woven microfiber web comprises a polyolefin.

13. The electret filter medium of claim 11 wherein the non-woven microfiber web comprises:
polypropylene; poly(4-methyl-1-pentene); copolymers of propylene and 4-methyl-1-pentene; or mixtures thereof.

14. The electret filter medium of claim 11 wherein the charge-enhancing additive comprising a hindered amine N-substituted succinimide oligomer comprises 0.1-5.0% by weight of the web.

15. The electret filter medium of claim 11 wherein the web contains a charge, wherein the charge is imparted through tribocharging, hydrocharging, DC corona treatment, or a combination thereof.

16. The electret filter medium of claim 15 wherein the web has sufficient electrostatic charge to exhibit filtration performance as measured by QF of 0.3 $(mm\ of\ H_2O)^{-1}$ or greater at a face velocity of 6.9 centimeters per second.

17. The electret filter medium of claim 11 wherein the filter medium comprises:
a respirator filter, a room ventilation system filter, a vehicle ventilation system filter, an air conditioner filter, a furnace filter, a room air purifier filter, a vacuum cleaner filter, or a computer disk drive filter.

18. The electret filter medium of claim 11 wherein the filter medium in combination with a respirator assembly is a component of a respiratory device designed to be used by a person.

19. The electret filter medium of claim 11 wherein the filter medium has a % Penetration Ratio of at least 300% at a face velocity of 6.9 centimeters per second when tested according to the X-ray Discharge Test.

20. The electret filter medium of claim 11 wherein the filter medium has an Initial Quality Factor of at least 0.3 (mm of $H_2O)^{-1}$ at a face velocity of 6.9 centimeters per second, and after exposure to X-rays for 60 minutes, a Quality Factor of less than 50% of the Initial Quality Factor, when tested according to the X-ray Discharge Test.

* * * * *